3,000,723
FERTILIZER COMPOSITION COMPRISING A NITROGENOUS COMPOUND AND HYDRAZINE OR HYDRAZINE SALTS
Peter C. Stevenson, 4352 Emory Way, Livermore, Calif., and Edward R. Hewitt, deceased, late of 435 E. 52nd St., Parksville, N.Y., by Abram S. Hewitt, executor, New York, N.Y.
No Drawing. Filed Apr. 19, 1957, Ser. No. 654,046
10 Claims. (Cl. 71—30)

The present invention pertains to a fertilizer composition and to a process of using the same.

When a nitrogenous compound which liberates ammonia is applide to soil on which a crop, such as hay, is being grown, only a portion of the nitrogen from the ammonia liberated by the compound appears in the crop as plant protein. Even with the most skillful treatment, in terms of proper timing of the application of the nitrogenous compound of the soil and the harvesting of the crop, it is not possible to recover more than half of the applied nitrogen in the crop. Somehow a large amount of the nitrogen from the nitrogenous compound is lost to the crop within a few days after its application to the soil. This loss, of course, is highly uneconomical and is of considerable concern to farmers.

Accordingly, it is an object of the present invention to provide a fertilizer composition so composed that upon application thereof to soil the nitrogen present in the fertilizer will be readily available for consumption by a crop over a considerable period of time, such as a matter of weeks. It is a further object of the invention to provide a process for increasing the nitrogen available in soil for plant consumption without the large losses of nitrogen encountered heretofore.

We believe that only a small amount of the nitrogen appears in a crop as plant protein when a nitrogenous compound which liberates ammonia is applied to the soil because certain soil bacteria rapidly consume the ammonia liberated from the nitrogenous compound and thereby make it unavailable for plant consumption. If the ammonia-consuming activity of the soil bacteria could be inhibited, then the ammonia would be available for plant consumption. Working upon this theory we have developed a fertilizer composition which markedly increases the nitrogen from the ammonia available in the soil for plant consumption over a considerable period of time and accordingly we believe that our theory is correct.

The fertilizer composition of the invention comprises a nitrogenous compound which liberates ammonia due to the action of soil bacteria thereon. Typical examples of such nitrogenous compounds are urea, ammonia, and ammonium nitrate. There is also present in the fertilizer composition a compound which inhibits the consumption of ammonia by soil bacteria, typical examples thereof being hydrazine or hydrazine salts, such as hydrazine chloride, hydrazine sulfate, hydrazine formate, or hydrazine acetate. Only a very small amount of the inhibitor compound need be used in conjunction with the nitrogenous compound. We have found that the ratio of inhibitor compound to nitrogenous compound lies in the range of from about 1:6000 parts to about 1:8000 parts, and preferably about 1:7000 parts.

In the process of the invention for increasing the nitrogen available in soil for plant consumption without large losses of nitrogen the conventional amounts of fertilizer composition are employed. Thus, there are added per acre of soil from about 50 pounds to about 300 pounds of nitrogen in the form of the fertilizer composition.

The following tests clearly establish the remarkable properties of our fertilizer composition which is made merely by mixing the components together.

A sample of several pounds of soil from improved hay land in the Catskill Mountain area of New York State was dried in air without heating, gently pulverized, and thoroughly mixed. Twenty gram samples of this soil were placed in glass tubes and to these were added a nitrogenous compound which liberates ammonia and a typical inhibitor compound, i.e., hydrazine sulfate, in the amounts set forth in Tables I through III below, and six milliliters of water. Comparative soil samples containing water only or a nitrogenous compound without an inhibitor compound were also prepared. The tubes were stoppered with cotton plugs and placed in a rack under a bell jar along with an open beaker of water to saturate the atmosphere and prevent evaporation from the samples. Aliquots of 1.3 grams of moist soil (1 gram of dry soil) were removed from time to time and analyzed for ammonia content. The analytical results were converted to pounds of nitrogen per acre, one acre being equal to 2,000,000 pounds of dry soil. The temperature during the tests ranged between 65° F. and 70° F. and the pH of the soil was in the range from 6.5 to 6.8. Tables I through III below show typical results of the tests.

Table I

| Days After Addition of Reagents | Lbs. of Nitrogen per Acre After Addition of water only | Lbs. of Nitrogen per Acre after Addition of 100 lbs. of Nitrogen (as Urea) per Acre of Soil | Lbs. of Nitrogen per Acre after Addition of 100 lbs. of Nitrogen (as Hydrazine Sulfate and Urea of a ratio of 1:7000 parts) per Acre of Soil |
|---|---|---|---|
| 2 | 46 | 40 | 28 |
| 4 | 44 | 39 | 10 |
| 10 | 37 | 35 | 76 |
| 14 | 32 | 32 | 120 |
| 19 | 26 | 28 | 60 |

Table II

| Days After Addition of Reagents | Lbs. of Nitrogen per Acre After Addition of water only | Lbs. of Nitrogen per Acre after Addition of 200 lbs. of Nitrogen (as Urea) per Acre of Soil | Lbs. of Nitrogen per Acre after Addition of 200 lbs. of Nitrogen (as Hydrazine Sulfate and Urea of a ratio of 1:7000 parts) per Acre of Soil |
|---|---|---|---|
| 3 | 45 | 45 | 20 |
| 8 | 39 | 36 | 76 |
| 12 | 35 | 30 | 120 |
| 16 | 29 | 34 | 150 |
| 21 | 24 | 32 | 100 |
| 24 | 20 | 30 | 48 |

Table III

| Days After Addition of Reagents | Lbs. of Nitrogen per Acre After Addition of Water only | Lbs. of Nitrogen per Acre after Addition of 100 lbs. of Nitrogen (as Ammonia) per Acre of Soil | Lbs. of Nitrogen per Acre after Addition of 100 lbs. of Nitrogen (as Hydrazine Sulfate and Ammonia of a Ratio of 1:7000 parts) per Acre of Soil |
|---|---|---|---|
| 2 | 46 | 20 | 12 |
| 5 | 43 | 22 | 28 |
| 12 | 35 | 20 | 78 |
| 15 | 31 | 20 | 100 |
| 18 | 27 | 26 | 110 |
| 21 | 24 | 33 | 50 |

A study of the data above in the second columns of Tables I through III shows that when water alone was added to the soil in the control sample, the ammonia content (calculated as nitrogen) of the soil was 45 pounds of nitrogen per acre after about two days had elapsed from the time of adding the water to the soil and that the amount of nitrogen per acre over a period of about 24 days dropped steadily in an essentially straight line relationship to a value of about 20 pounds of nitrogen per acre. These data show that there was ammonia present in the soil even in the absence of the addition thereto of a nitrogenous compound which liberates ammonia, and accordingly these data form base values for comparison of the data in the third and fourth columns of the tables.

When 100 pounds or 200 pounds of nitrogen per acre of soil were added to the soil in the form of urea (see third columns of Tables I and II), the amount of nitrogen per acre of soil during a period of about three weeks was not appreciably different than the amount present therein during the same period when water alone was added to the soil. This clearly indicates that most of the ammonia liberated by the urea was rapidly consumed by the soil bacteria and retained therein so that a very large portion of it was not available in the soil for plant consumption.

As shown by the data in column four of Tables I and II, however, when 100 pounds or 200 pounds of nitrogen per acre of soil in the form of urea and hydrazine sulfate were added to the soil, the amount of ammonia (calculated as nitrogen) present in the soil after the first few days was quite low but after about ten days the amount of ammonia present in the soil and therefore available for plant growth rapidly increased and remained at a high value for about a week and a half.

The data obtained in Table III when ammonia was used as the nitrogenous compound which liberates ammonia is comparable to that obtained when urea was the nitrogenous compound in the fertilizer composition.

As pointed out above the results noted in Tables I through III are believed to be due to the action of soil bacteria. We have postulated that such bacteria are in competition with crop plants for the available nitrogen, which the bacteria absorb into their bodies and render unavailable to the plants. The inhibitor compounds, such as hydrazine or hydrazine salts, are chemically similar to the ammonia liberated by the nitrogenous compounds of the fertilizer composition and presumably are absorbed by the bacteria along with the ammonia. The absorption of the hydrazine or hydrazine salts by the bacteria apparently prevents the metabolism of the ammonia in the bacteria so that the ammonia is again liberated from the bacteria almost completely without change after a few days either by the death and decomposition of the ammonia-consuming bacteria, or by their excreting it along with the hydrazine or hydrazine salts.

In soils previously sterilized by heating to 240° F., ammonia is liberated very slowly from urea. We, therefore, postulate that some classes of bacteria aid in the liberation of ammonia from urea. An excessive amount of hydrazine, we believe, harms these bacteria as well as the unwanted varieties, thus accounting for the upper limit of the ratio of hydrazine to urea in the fertilizer composition. Moreover, smaller amounts of hydrazine or hydrazine salts than those given above also do not give the desired results, apparently because there is an insufficient amount thereof present to interfere with the metabolism of the ammonia-consuming bacteria.

It will be appreciated that various modifications and changes may be made in the invention herein set forth without departing from the spirit thereof, and accordingly the invention is to be limited only within the scope of the appended claims.

We claim:

1. A fertilizer composition comprising (1) a nitrogenous compound selected from the group consisting of ammonia, ammonium nitrate, and urea and (2) a compound selected from the group consisting of hydrazine and hydrazine salts; the relative amounts of said compounds being about one part by weight of compound (2) for each 6000 to 8000 parts by weight of compound (1).

2. A fertilizer composition comprising urea and hydrazine sulfate; the relative amounts of said compounds being about one part by weight of hydrazine sulfate for each 6000 to 8000 parts by weight of urea.

3. A fertilizer composition comprising ammonia and hydrazine sulfate; the relative amounts of said compounds being about one part by weight of hydrazine sulfate for each 6000 to 8000 parts by weight of ammonia.

4. A fertilizer composition comprising urea and hydrazine sulfate; the relative amounts of said compounds being about one part by weight of hydrazine sulfate to 7000 parts by weight of urea.

5. A fertilizer composition comprising ammonia and hydrazine sulfate; the relative amounts of said compounds being about one part by weight of hydrazine sulfate to 7000 parts by weight of ammonia.

6. A process for increasing the nitrogen available in soil for plant consumption comprising adding per acre of soil from about 50 pounds to about 300 pounds of nitrogen in the form of a fertilizer composition comprising (1) a nitrogenous compound selected from the group consisting of ammonia, ammonium nitrate, and urea and (2) a compound selected from the group consisting of hydrazine and hydrazine salts; the relative amounts of said compounds being about one part by weight of compound (2) for each 6000 to 8000 parts by weight of compound (1).

7. A process for increasing the nitrogen available in soil for plant consumption comprising adding per acre of soil from about 50 pounds to about 300 pounds of nitrogen in the form of a fertilizer composition comprising urea and hydrazine sulfate; the relative amounts of said compounds being about one part by weight of hydrazine sulfate for each 6000 to 8000 parts by weight of urea.

8. A process for increasing the nitrogen available in soil for plant consumption comprising adding per acre of soil from about 50 pounds to about 300 pounds of nitrogen in the form of a fertilizer composition comprising ammonia and hydrazine sulfate; the relative amounts of said compounds being about one part by weight of hydrazine sulfate for each 6000 to 8000 parts by weight of ammonia.

9. A process for increasing the nitrogen available in soil for plant consumption comprising adding per acre of soil from about 50 pounds to about 300 pounds of nitrogen in the form of a fertilizer composition comprising urea and hydrazine sulfate; the relative amounts of said compounds being about one part by weight of hydrazine sulfate to 7000 parts by weight of urea.

10. A process for increasing the nitrogen available in soil for plant consumption comprising adding per acre of soil from about 50 pounds to about 300 pounds of nitrogen in the form of a fertilizer composition comprising ammonia and hydrazine sulfate; the relative amounts of said compounds being about one part by weight of hydrazine sulfate to 7000 parts by weight of ammonia.

References Cited in the file of this patent

UNITED STATES PATENTS

| | | |
|---|---|---|
| 2,317,631 | Meyer | Apr. 27, 1943 |
| 2,783,130 | Nicolaisen | Feb. 26, 1957 |
| 2,803,523 | Duetschman et al. | Aug. 20, 1957 |

OTHER REFERENCES

Ephraim, F.: "Inorganic Chemistry," 4th Ed., Nordeman Publ. Co., Inc., N.Y., 1943, page 656.

Journal of Bacteriology, vol. 47, January-June, 1944, Utilization . . . Fixation, by Horner, C.D., et al., pages 1–14.

Biochemical Journal, vol. 40, 1946, pages 824–28.